June 13, 1944.  W. A. McMILLAN  2,351,532
GAS ANALYSIS APPARATUS
Filed Nov. 9, 1940
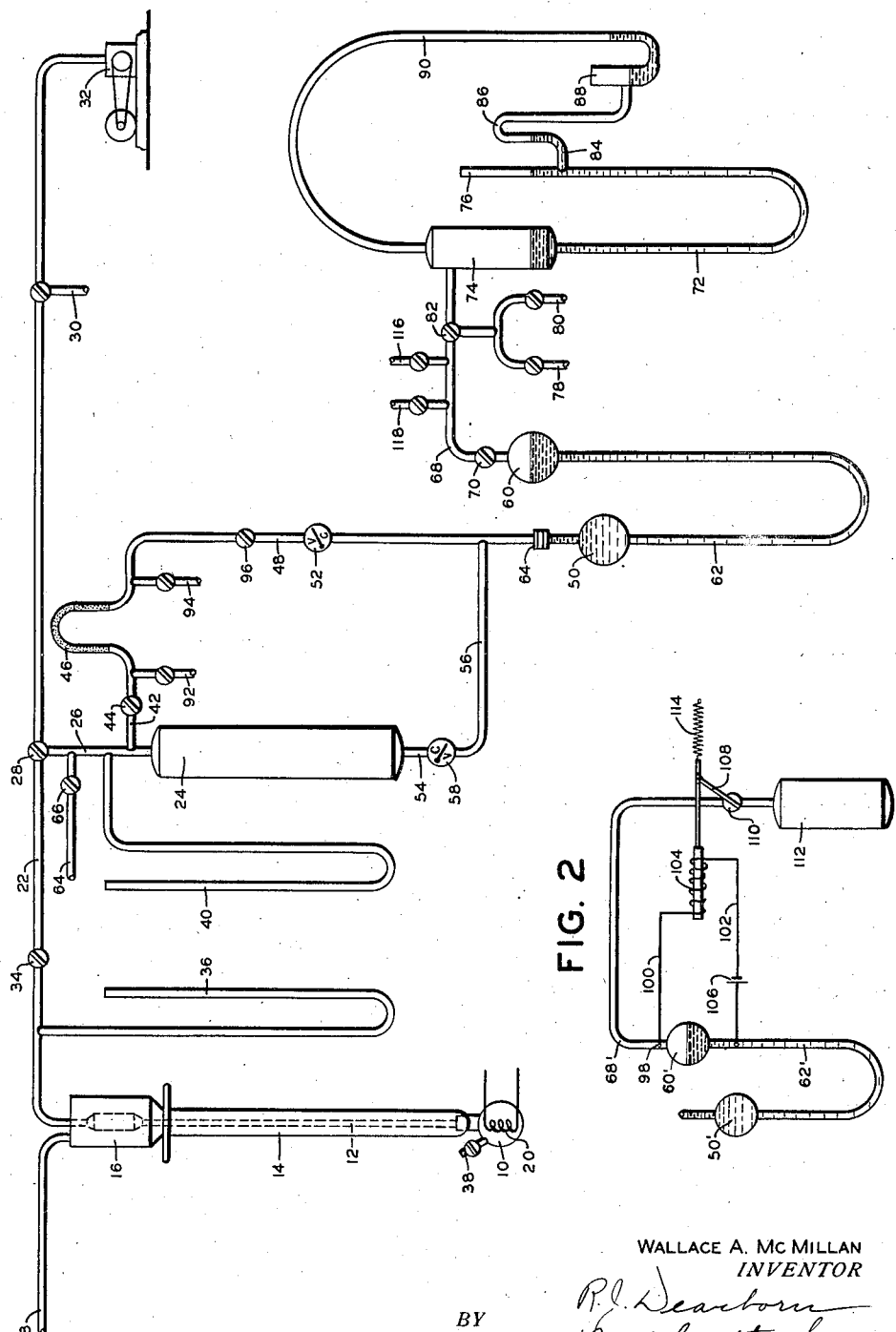
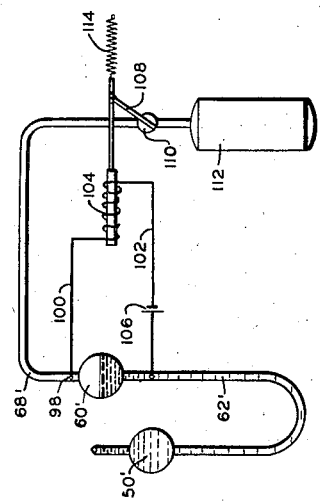
FIG. 1
FIG. 2
WALLACE A. McMILLAN
*INVENTOR*
BY R. J. Dearborn
Daniel Stryker
*HIS ATTORNEYS*

Patented June 13, 1944

2,351,532

UNITED STATES PATENT OFFICE 2,351,532

GAS ANALYSIS APPARATUS

Wallace A. McMillan, Forest Hills, N. Y., assignor, by mesne assignments, to The Texas Company, New York, N. Y., a corporation of Delaware Application November 9, 1940, Serial No. 364,996

2 Claims. (Cl. 23—254)

This invention relates to gas analysis and more particularly to a method and apparatus for quantitatively determining the percentages of gaseous olefins and paraffins in a gaseous mixture containing the same.

In the past quantitative analysis of gaseous mixtures has frequently been accomplished by passing these mixtures through various absorption mediums which are active to absorb one or more constituents of the mixture while remaining inactive to absorb other constituents thereof. Although this method may be generally satisfactory for analyzing certain gaseous mixtures, it is not accurate for other gaseous mixtures since it is frequently impossible to find reagents which will absorb one of the constituents to substantial completion without at the same time absorbing any appreciable quantity of another constituent. This is particularly true in the analysis of hydrocarbon gases containing both paraffin hydrocarbons and olefins. An absorption analysis of this type also requires much time and is generally difficult due to the handling of the gaseous mixture in passage through a number of absorption reagents.

The principal object of the present invention is to provide a method of and apparatus for analyzing a gaseous mixture which is quantitatively accurate, and which may be readily carried out with a minimum of time consumption and of equipment. Another object of the invention is to provide a method and apparatus for quantitatively analyzing a complex mixture of gases such as a gaseous hydrocarbon mixture obtained from oil refineries or other by-product gases, including complex mixtures of hydrocarbon gases containing both saturated and unsaturated hydrocarbon constituents.

In my copending patent application Serial No. 359,853, filed October 5, 1940, I have disclosed an apparatus for the precise analytical distillation and fractionation of gaseous mixtures in which a distilling bulb is surmounted by an elongated fractionating column having a partial condenser at its upper end, the column having an offtake leading to receivers, each of which is adapted to receive and hold a mixture of vapors produced by the fractionation. Automatic regulation of the distillation is provided and the apparatus also includes equipment for automatically recording the temperatures of fractionation and the pressures of the vapors passed to the various receivers.

In the U. S. Patents Nos. 2,147,606 and 2,147,607 to McMillan et al. granted February 14, 1939, a method and an apparatus are disclosed for analyzing mixtures of gases such as hydrocarbon gases containing both saturated and unsaturated hydrocarbon constituents. As described in those patents, a sample of the gaseous mixture to be analyzed is confined within a closed system, wherein the gas volume can be measured under regulated conditions of temperature and pressure. Another gas which is chemically reactive with a constituent or constituents of the mixture to be analyzed is added to that mixture and the volume of the added gas is determined. The mixture of gases is then passed through a treating zone, as in contact with a catalyst, until substantially complete reaction of the known gas with the constituent or constituents of the gaseous mixture takes place, resulting in a change or reduction in total volume of the gases. The volume of the reacted gases is then measured and from this the proportion of the constituent or constituents of the gaseous mixture may be computed.

In accordance with the present invention, a sample of a gaseous mixture is fractionated and the cuts are passed to suitable receivers, one or more of which may then contain a mixture of hydrocarbons which could not be separated by fractional distillation such as, for instance, propylene and propane. The volume of the mixture of gases in such a receiver is measured, after which a known amount of hydrogen is added to the receiver. The mixture is then passed back and forth over a hydrogenation catalyst until there is no further decrease in the volume of gases. The difference between the volume of the mixture before and after hydrogenation is a direct measure of the olefin content of the mixture. Apparatus is provided for the fractional distillation and for automatically circulating the gaseous mixture back and forth over the catalyst.

For a better understanding of the invention, reference may be had to the accompanying drawing in which:

Figure 1 is an elevational view, generally diagrammatic, of an apparatus embodying the improvements of the invention and, Figure 2 is an elevation showing a modified form of part of the apparatus for circulating the mixture.

Referring to the drawing, a distillation bulb 10 is surmounted by an elongated fractionating tube 12 of small diameter, which tube is provided with a vacuum jacket 14. The bulb 10 may be surrounded with a thermos bottle for low temperature work and the upper end of the tube or column 12 is cooled by a partial condenser 16 which may receive a suitable cooling medium, such as liquid air or liquid nitrogen through the tube 18. An electrical heating coil 20 is submerged in the bulb 10 and affords means for the controlled heating of the sample. Vapors which remain uncondensed pass through a conduit 22 to a plurality of receivers, one of which is indicated at 24 and which is connected to the vapor passage or conduit 22 through tube 26 and a shut-off valve 28. Another tube 30 is shown as leading from the conduit 22 to another receiver, not shown, and the conduit 22 preferably extends to a suitable vacuum pump 32 which is adapted to evacuate the entire unit. It is to be understood that any number of receivers may be connected to the manifold or conduit 22, depending on the number of fractions it is desired to separate from the sample by fractional distillation. The pressure of distillation is controlled by a suitable adjustable rate valve 34 which may be manually controlled as disclosed in my U. S. Patent No. 2,005,323 granted June 18, 1935 or automatically adjustable as disclosed in my aforementioned copending application Serial No. 359,853, and is measured by a manometer 36 communicating with the conduit 22 between the valve 34 and the fractionating column 12.

In operation of the apparatus thus far described, a sample of the gas to be analyzed is supplied to the bulb 10 through the valved tube 38 and is pre-cooled in any suitable manner, such as by immersing the bulb in a thermos flask containing liquid air or other suitable cooling medium. The first fixed gas cut is then collected in one of the receivers 24 for further analysis. A controlled heating of the sample then effects distillation of the liquified portion, the vapors passing upwardly through the column 12, a portion of the vapors being condensed by partial condenser 16, thereby providing reflux for the column which travels down the tube 12 counter-current to the upflowing vapors. The sharp fractionation thereby obtained enables the separation of constituents of the mixture, according to their boiling points, the temperature of distillation being measured by a suitable thermocouple (not shown) positioned in the upper portion of the column 12. As long as one constituent or compound of the mixture is being vaporized, the distillation temperature will remain substantially constant and during this time the distilled vapors will be collected in one of the receivers 24.

In complicated hydrocarbon mixtures containing both saturated and unsaturated hydrocarbons, it may not prove possible to separate certain saturated or unsaturated hydrocarbons having approximately the same boiling points, such as propylene which boils at −47 C., and propane, boiling at −42 C., the result of which is that the distilled vapor accumulated in one or more of the receivers 24 may still be a mixture of two or more hydrocarbons. In order to measure the olefin content of a mixture of this kind the method and apparatus now to be described is provided.

The pipe 26 leading to the receiver 24 has connected thereto a suitable manometer 40 capable of measuring the volume of the mixture of gases, such as propylene and propane, in the receiver 24. Also communicating with the pipe 26 is another pipe 42 containing a valve 44 and leading to a catalyst tube 46 formed in the shape of an inverted U and adapted to be filled with a catalyst to be described hereinafter. A pipe 48 connected to the other leg of the catalyst tube 46 leads downwardly to a container, such as the bulb 50, preferably arranged at a level below the lower end of the receiver 24. The pipe 48 is provided with a check valve 52 adapted to prevent flow of gases downwardly through the pipe. A pipe 54 connects the lower end of the receiver 24 to the pipe 48 through another pipe 56 containing a check valve 58 adapted to prevent flow of gases toward the receiver 24. Another container or bulb 60 is connected to the bulb 50 by means of a barometric U tube connection 62 and is disposed at a slightly higher elevation than the bulb 50. The bulbs 50 and 60 and the tube 62 are adapted to contain a liquid such as mercury, and in order to prevent the mercury from passing upwardly in the pipe 48, a liquid valve 64 is provided of a type similar to that disclosed in my U. S. Patent 2,005,323, granted June 18, 1935. This valve preferably comprises a disc of sintered glass held in the pipe 48 by suitable means such as a pair of flanges or a direct seal as disclosed in my copending application Serial No. 359,853. The sintered glass disc being porous is constructed so as to be permeable to vapors but impervious to mercury. Gases may, therefore, pass downwardly into the bulb 50 but the mercury will not be able to pass upwardly in the pipe 48 above the valve 64. A source of hydrogen is adapted to be connected to the receiver 24 through a suitable connection 64 containing a valve 66. After the volume of the gases in receiver 24 are measured by means of the manometer 40, hydrogen is added to the receiver through the pipe 64 and the volume of the mixture of gases then in the receiver is measured by noting the pressure increase on the manometer 40. The mixture of hydrogen and olefin containing gas is then circulated back and forth through the catalyst tube 46 by means of the following equipment. The bulb 60 is connected by means of a pipe 68 containing a valve 70 to a U-shaped tube 72 having an enlarged closed portion 74 and an open end 76. A source of vacuum is adapted to be connected to the pipe 68 through a tube containing a valve 78 and a source of air pressure may, if desired, be connected to the pipe 68 through the valve 80. A valve 82 in the pipe 68 serves to connect this pipe with the vacuum or the air supply. Leading from the tube 72 is another tube 84 containing an inverted U-shaped portion 86 connected in turn to an open-topped tube 88, the lower end of which is connected through conduit 90 to the portion 74 of the tube 72.

The operation of this apparatus is as follows: Vacuum is applied through valves 78 and 82 to the pipe 68, whereupon mercury will rise in the bulb 60, in the closed leg of the tube 72 and in the tube 90 until the mercury in tube 90 syphons into the top of the member 74, whereupon air will enter through the open-topped tube 88. The mercury will then drop in bulb 60 and in the closed leg of the tube 72 until a point is reached in the open leg of tube 72 where the mercury will syphon back into the tube 88. The bottom of the tube 88 will thus be sealed off and the vacuum cycle will be restored. As the mercury rises in bulb 60, it will, of course, drop correspondingly in the bulb 50, which results in gas passing from the receiver 24 through the check valve 58 and the porous valve 64 into the bulb 50. When the mercury falls in bulb 60 and rises in bulb 50 the check valve 58 will close and the gas from bulb 50 will pass through the check valve 52 over the catalyst in the tube 46 and back into the receiver 24. This operation will continue substantially automatically and after sufficient hydrogenation has taken place the volume of the mixture will reach a constant minimum which can be measured by means of the manometer 40. The difference between this volume and the volume of the mixture of hydrogen and olefin containing gas before hydrogenation will be a direct measure of the olefin content of the gas sample.

Although any suitable hydrogenation catalyst may be embodied within the tube or chamber 46, it is preferred that a catalyst be used which is effective at atmospheric temperatures. For this purpose very satisfactory results have been secured with catalysts selected from reduced nickel, cobalt and platinum. By way of example, the preparation of such a reduced nickel catalyst is herein described. An amount of shredded, long-fibre asbestos is digested with hot nitric acid, after which it is washed, dried and ignited. The asbestos is then transferred to a clean procelain evaporating dish to which is added a quantity of C. P. nickel nitrate hexahydrate. Sufficient boiling distilled water is added to the mixture to allow the asbestos to become thoroughly saturated with the solution on stirring, after which an amount of C. P. concentrated ammonium hydroxide is added to the mixture and the mass thoroughly stirred to a thick paste. The dish should be covered and allowed to dry as much as possible on a steam bath. The final drying is accomplished in an oven at 105° C. for about eight hours, after which the dry mass is then broken up with a glass rod and packed in the U tube to be used for the catalyst chamber. Both ends of the tube are then plugged loosely with ignited asbestos or glass wool and the tube is then heated to a temperature of about 310° C. while air is pulled through it. This is continued until no further brown fumes are evolved and the whole mass has become entirely black. The tube is then cooled and connected to the apparatus as shown in Figure 1 and preferably flushed out with hydrogen applied through the valved connections 92 and 94, the valves 44 and 96 remaining closed. After flushing with hydrogen the tube 46 is then preferably heated for several hours as by placing an electrical heater over and around the same, the temperature not exceeding about 325° C., while a current of hydrogen is still passing through the tube. When cooled in the absence of air the catalyst will be ready for use.

Other systems than the one shown could be used for oscillating the gases through the catalyst. As shown, for instance, in Figure 2, an electrical contact 98 can be mounted in the pipe 68' directly above the bulb 60' and this contact can be included in an electrical circuit comprising wires 100, 102, the solenoid 104 and a source of electrical supply 106. The circuit will be completed from the electrical source 106 to a point in the tube 62', which will be constantly submerged in the mercury. The armature of the solenoid 104 is connected to the operating arm 108 of a valve 110 in a line between the source of vacuum 112 and the pipe 68'. Assuming the valve 110 is held in its open position by means of a tension spring 114, the vacuum from 112 will be applied through the pipe 68' and the mercury will rise in bulb 60' until it makes contact with the member 98, whereupon the electrical circuit will be completed so that the solenoid 104 will close the valve 110, thus shutting off the vacuum. The valve 110 is preferably provided with a vent, not shown, by means of which the pipe 68' will be connected to atmosphere when the valve is in its closed position. The mercury will then drop in the bulb 60', thereby opening the electrical circuit and allowing spring 114 to open the valve 110 at which the cycle will be repeated.

It is understood that the apparatus which has been described can be applied to one or all of the receivers 24. If desired, the means shown to the right of valve 82 in Figure 1 may be connected through pipes 116 and 118 to additional bulbs 60 arranged to oscillate the gases back and forth from other receivers over their respective catalysts.

Obviously many modifications and variations of the invention, as hereinbefore set forth, may be made without departing from the spirit and scope thereof and, therefore, only such limitations should be imposed as are indicated in the appended claims.

I claim:

1. Apparatus for quantitatively determining the percentages of gaseous unsaturated and saturated hydrocarbons in a gaseous mixture containing the same, comprising a receiver for said mixture, a conduit connected to the receiver whereby a known volume of hydrogen may be introduced therein, a bulb adapted to contain mercury, a conduit connecting said bulb and said receiver and containing a hydrogenation catalyst, a second conduit connecting said bulb and said receiver and means for automatically and intermittently drawing the mixture of the hydrogen-containing gases from said receiver into said bulb through said second conduit and then returning the mixture through said catalyst to said receiver through the first-mentioned conduit, said last-mentioned means comprising a U tube closed at one end, said end being connected to said bulb, a tubular container having its upper end open and its lower end connected to the closed end of said U tube, an inverted U tube connected at one end to the open leg of said first U tube and at the other end to said container, said container, said U tubes and said bulb normally holding a quantity of mercury, a source of vacuum connected to the closed end of said first mentioned U tube, the arrangement being such that the vacuum will draw mercury from said bulb and from said container so as to draw gases from the receiver into the bulb, whereupon air will enter through the open end of said container to break the vacuum, thus allowing mercury to return to said bulb, forcing the gases through the catalyst and back into said receiver, and a manometer communicating with said receiver for indicating the volume of hydrogen-containing gases in said receiver before and after said gases are passed through said catalyst.

2. Apparatus for quantitatively determining the percentages of gaseous olefins and paraffins in a gaseous mixture containing the same, comprising a receiver adapted to hold said mixture, a conduit connected to said receiver whereby a known volume of hydrogen may be introduced therein, a conduit connected to the upper and lower ends of said receiver, a quantity of a hydrogenation catalyst in said conduit, a pair of oppositely opening check valves in said conduit, and means for intermittently withdrawing a portion of the hydrogen-containing gaseous mixture, passing said portion in contact with said catalyst and back into said receiver, said last-named means comprising a closed vessel communicating with said conduit between said check valves, a quantity of mercury in said vessel, a second vessel disposed at a higher elevation than said first vessel, a tube connecting said vessels, means for intermittently applying a vacuum to said second vessel whereby mercury is alternately drawn into said second vessel from said first vessel and then gravitated back to said first vessel, said last-named means comprising a vacuum siphon, a manifold connecting said siphon to said second vessel, a source of vacuum connected to said manifold, and a manometer communicating with said receiver for measuring the volume of hydrogen-containing gases in said receiver before and after said gases are passed through said catalyst.

WALLACE A. McMILLAN.